US012718610B2

(12) United States Patent
Li et al.

(10) Patent No.: US 12,718,610 B2
(45) Date of Patent: Aug. 25, 2026

(54) MOVING TEXT REGION DETECTION FOR BROKEN TEXT RECOVERY

(71) Applicant: Samsung Electronics Co., Ltd., Suwon-si (KR)

(72) Inventors: Zhong Li, Aliso Viejo, CA (US); Yoon kyung Kim, Lake Forest, CA (US); Hunsop Hong, Irvine, CA (US); Seongnam Oh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 18/488,852

(22) Filed: Oct. 17, 2023

(65) Prior Publication Data

US 2024/0404306 A1 Dec. 5, 2024

Related U.S. Application Data

(60) Provisional application No. 63/471,054, filed on Jun. 5, 2023.

(51) Int. Cl.
*G06V 30/19* (2022.01)
*G06V 10/25* (2022.01)
(Continued)

(52) U.S. Cl.
CPC ........ *G06V 30/19173* (2022.01); *G06V 10/25* (2022.01); *G06V 10/82* (2022.01); *G06V 30/1444* (2022.01); *G06V 30/148* (2022.01); *G06V 30/1801* (2022.01); *G06V 30/19147* (2022.01); *G06V 30/26* (2022.01)

(58) Field of Classification Search
None
See application file for complete search history.

(56) References Cited

U.S. PATENT DOCUMENTS 6,009,199 A * 12/1999 Ho ........................ G06F 18/211
382/226
6,681,053 B1 1/2004 Zhu
(Continued)

FOREIGN PATENT DOCUMENTS

CN 112801090 A 5/2021
CN 114240791 A 3/2022
(Continued)

OTHER PUBLICATIONS

Tsai et al, "2DVTE: A two-directional videotext extractor for rapid and elaborate design", Pattern Recognition, pp. 1496-1510, 2009 (Year: 2009).*

(Continued)

*Primary Examiner* — Edward Park
(74) *Attorney, Agent, or Firm* — Sherman IP LLP; Kenneth L. Sherman; Steven Laut

(57) ABSTRACT

One embodiment provides a method comprising receiving content for presentation on a display, and obtaining one or more sample frames of the content. The method further comprises generating a set of features based on one or more horizontal edge signals and one or more vertical edge signals of the one or more sample frames. The method further comprises utilizing a classification model to detect, based on the set of features, a region of interest of moving text in the one or more sample frames.

20 Claims, 7 Drawing Sheets

(51) Int. Cl.

| | |
|---|---|
| ***G06V 10/82*** | (2022.01) |
| ***G06V 30/14*** | (2022.01) |
| ***G06V 30/148*** | (2022.01) |
| ***G06V 30/18*** | (2022.01) |
| ***G06V 30/26*** | (2022.01) |

(56) References Cited

U.S. PATENT DOCUMENTS

| | | | | |
|---|---|---|---|---|
| 8,320,674 | B2 * | 11/2012 | Guillou | G06V 30/158 382/164 |
| 8,355,564 | B2 | 1/2013 | Aoki et al. | |
| 8,503,780 | B2 | 8/2013 | Chung et al. | |
| 9,218,782 | B2 | 12/2015 | Omprakash | |
| 9,451,206 | B2 | 9/2016 | Chen et al. | |
| 9,524,430 | B1 | 12/2016 | Cho | |
| 9,530,069 | B2 | 12/2016 | Manmatha | |
| 9,569,679 | B1 | 2/2017 | Gray et al. | |
| 9,807,339 | B2 | 10/2017 | Chen et al. | |
| 10,148,881 | B2 | 12/2018 | Beysserie et al. | |
| 10,430,662 | B2 * | 10/2019 | Katz | G06V 30/19173 |
| 2005/0105820 | A1 | 5/2005 | Zhou et al. | |
| 2007/0286499 | A1 | 12/2007 | Freiburg et al. | |
| 2009/0016618 | A1 | 1/2009 | Zhou | |
| 2013/0156308 | A1 | 6/2013 | Abe | |
| 2014/0072219 | A1 | 3/2014 | Tian | |
| 2019/0130187 | A1 | 5/2019 | Hu et al. | |
| 2020/0302294 | A1 * | 9/2020 | Kadav | G06F 16/783 |
| 2023/0113757 | A1 | 4/2023 | Chiang et al. | |
| 2023/0147550 | A1 * | 5/2023 | He | G06N 3/08 382/155 |
| 2023/0197082 | A1 | 6/2023 | Wang | |
| 2023/0325685 | A1 * | 10/2023 | Caba Heilbron | G06V 10/764 |
| 2024/0169498 | A1 | 5/2024 | Shi et al. | |

FOREIGN PATENT DOCUMENTS

| | | | |
|---|---|---|---|
| CN | 114296842 | A | 4/2022 |
| CN | 115348362 | A | 11/2022 |
| CN | 115359502 | A | 11/2022 |
| JP | 2001-117529 | A | 4/2001 |
| KR | 10-2009-0006724 | A | 1/2009 |

OTHER PUBLICATIONS

Xu, et al, “End-to-End Subtitle Detection and Recognition for Videos in East Asian Languages via CNN Ensemble with Near-Human-Level Performance”, CV, pp. 1-38, 2016 (Year: 2016).*

Droettboom, “Correcting broken characters in the recognition of historical printed documents”, Digital Knowledge Center, pp. 1-3, 2003 (Year: 2003).*

Carvalho et al, “Automatic TV Logo Identification for Advertisement Detection without Prior Data”, Applied Sciences, pp. 1-17, 2021 (Year: 2021).*

Elshahaby, “An end to end system for subtitle text extraction from movie”, Short communication, pp. 1-2, 2021 (Year: 2021).*

Pal et al, “Context-aware television-internet mash-ups using logo detection and character recognition”, PAA, 2015, pp. 191-205 (Year: 2015).*

Xu et al, “End-to-end subtitle detection and recognition for videos in East Asian languages via CNN ensemble”, SPIC, 2018, pp. 131-143 (Year: 2018).*

Crandall et al, “Extraction of special effects caption text events from digital video”, IJDAR, pp. 1-20, 2003 (Year: 2003).*

Baek, Y., et al., “Character Region Awareness for Text Detection”, 2019 IEEE/CVF Conference on Computer Vision and Patter Recognition (CVPR), Apr. 3, 2019, pp. 9365-9374, IEEE, United States.

Tang, Y. et al. “Scene text detection and segmentation based on cascaded convolution neural networks.” IEEE transactions on Image Processing 26, Jan. 20, 2017, pp. 1509-1520, No. 3, IEEE, United States [Abstract Only].

International Search Report and Written Opinion dated Apr. 1, 2024 for International Application PCT/KR2024/004193, from Korean Intellectual Property Office, pp. 1-9, Republic of Korea.

Tibermacine, A. et al., “An End-to-End Trainable Capsule Network for Image-Based Character Recognition and Its Application to Video Subtitle Recognition”, ICTACT Journal on Image and Video Processing, Feb. 2021, pp. 2380-2386, vol. 11, Issue: 03, United States.

U.S. Non-Final Office Action for U.S. Appl. No. 18/488,858 mailed Aug. 12, 2025.

U.S. Final Office Action for U.S. Appl. No. 18/488,858 mailed Dec. 9, 2025.

U.S. Notice of Allowance for U.S. Appl. No. 18/488,858 mailed Mar. 11, 2026.

U.S. Corrected Notice of Allowability for U.S. Appl. No. 18/488,858 mailed May 8, 2026.

* cited by examiner

MOVING TEXT REGION DETECTION FOR BROKEN TEXT RECOVERY

CROSS-REFERENCE TO RELATED APPLICATIONS

The present application claims priority to U.S. Provisional Patent Application No. 63/471,054, filed on Jun. 5, 2023, incorporated by reference in its entirety.

TECHNICAL FIELD

One or more embodiments generally relate to video processing, in particular, a method and system for moving text region detection for broken text recovery.

BACKGROUND

Visual artifacts are anomalies or distortions apparent during visual representation of media (e.g., images, video). For example, visual artifacts may arise as a result of frame rate conversion.

SUMMARY

One embodiment provides a method comprising receiving content for presentation on a display, and obtaining one or more sample frames of the content. The method further comprises generating a set of features based on one or more horizontal edge signals and one or more vertical edge signals of the one or more sample frames. The method further comprises utilizing a classification model to detect, based on the set of features, a region of interest of moving text in the one or more sample frames.

Another embodiment provides a system comprising at least one processor and a non-transitory processor-readable memory device storing instructions that when executed by the at least one processor causes the at least one processor to perform operations. The operations include receiving content for presentation on a display, and obtaining one or more sample frames of the content. The operations further include generating a set of features based on one or more horizontal edge signals and one or more vertical edge signals of the one or more sample frames. The operations further include utilizing a classification model to detect, based on the set of features, a region of interest of moving text in the one or more sample frames.

A non-transitory processor-readable medium that includes a program that when executed by a processor performs a method comprising receiving content for presentation on a display, and obtaining one or more sample frames of the content. The method further comprises generating a set of features based on one or more horizontal edge signals and one or more vertical edge signals of the one or more sample frames. The method further comprises utilizing a classification model to detect, based on the set of features, a region of interest of moving text in the one or more sample frames.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
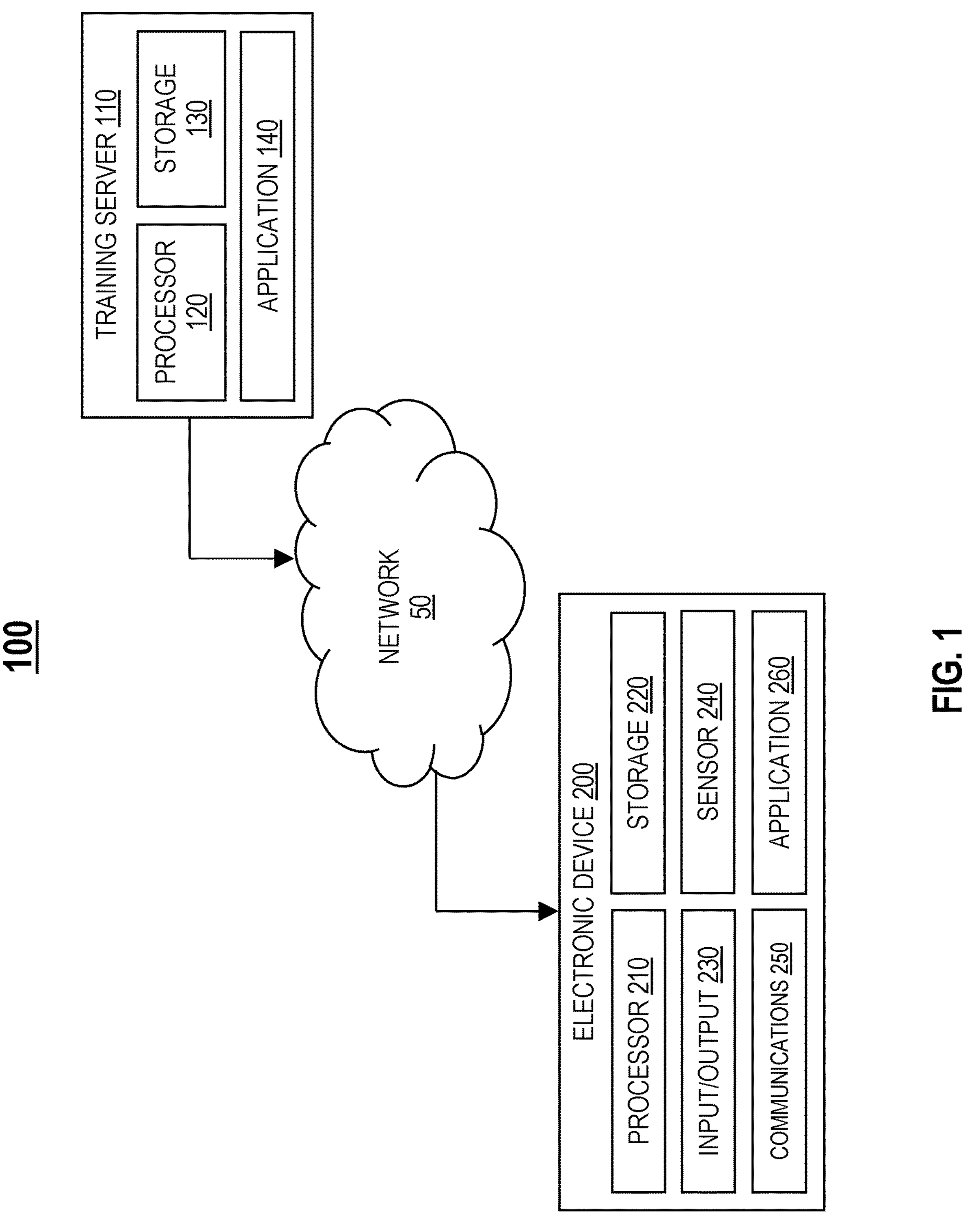
FIG. 1 illustrates an example computing architecture for moving text region detection for broken text recovery, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to video processing, in particular, a method and system for moving text region detection for broken text recovery. One embodiment provides a method comprising receiving content for presentation on a display, and obtaining one or more sample frames of the content. The method further comprises generating a set of features based on one or more horizontal edge signals and one or more vertical edge signals of the one or more sample frames. The method further comprises utilizing a classification model to detect, based on the set of features, a region of interest of moving text in the one or more sample frames.

Another embodiment provides a system comprising at least one processor and a non-transitory processor-readable memory device storing instructions that when executed by the at least one processor causes the at least one processor to perform operations. The operations include receiving content for presentation on a display, and obtaining one or more sample frames of the content. The operations further include generating a set of features based on one or more horizontal edge signals and one or more vertical edge signals of the one or more sample frames. The operations further include utilizing a classification model to detect, based on the set of features, a region of interest of moving text in the one or more sample frames.

A non-transitory processor-readable medium that includes a program that when executed by a processor performs a method comprising receiving content for presentation on a display, and obtaining one or more sample frames of the content. The method further comprises generating a set of features based on one or more horizontal edge signals and one or more vertical edge signals of the one or more sample frames. The method further comprises utilizing a classification model to detect, based on the set of features, a region of interest of moving text in the one or more sample frames.

For expository purposes, the term "moving text" as used in this specification generally refers to one or more lines of scrolling text displayed in content, and the term "moving text region" as used in this specification generally refers to an area or region of content that includes moving text. For expository purposes, the term "broken text" as used in this specification generally refers to moving text with visual artifacts (e.g., the moving text is distorted).

Some visual artifacts observed on a display device (e.g., a television) during presentation of content may originate from a source of the content itself. For example, the artifacts may result from erroneous frame rate conversion by a content provider if the frame rate of the content and a broadcasting system is different. Among various available frame rate conversions, 50 Hz to 60 Hz frame rate conversion shows the worst performance since this frame rate conversion utilizes only 16.7% of an original frame (compared to 60 Hz to 120 Hz frame rate conversion which utilizes 50% of an original frame).

One or more embodiments provide a framework for detecting a location of a moving text region and restoring broken text in the area/region. In one embodiment, the framework utilizes a classifier to detect a moving text region. In one embodiment, the classifier is trained using a training set comprising image/pixel patches of sample images of different content channels, wherein each sample image displays a moving text region. The resulting trained classifier is configured to classify an image displaying a moving text region as originating from a known content channel or background based on where and how the moving text region is displayed. The classifier is trained to learn distinguishable features/patterns, resulting in a robust and efficient classifier configured to accurately detect a moving text region despite an unconstrained background.

A line of text ("text line") often has a stronger vertical edge signal than other areas/regions of content. Text is often displayed against/on a high contrast banner which has strong horizontal edge signal based on the contrast between the banner and a background scene. A ratio of horizontal edge signal to vertical edge signal generates sharp peaks while substantially flat elsewhere.

In one embodiment, each image/pixel patch included in the training set is a 100×160 image/pixel patch segmented from a middle bottom of a subsampled grayscale image of size 270×480 pixels (i.e., a sample image), wherein the image/pixel patch excludes interference from unrelated areas/regions of the image and maintains a small search space.

By averaging edge signals (i.e., horizontal edge signals and vertical edge signals) among sample images of each content channel, a peak position and strength of vertical edge signal and a ratio of horizontal edge signal to vertical edge signal forms distinguishable features/patterns.

In one embodiment, the classifier is trained to classify an image displaying a moving text region as originating from one of a plurality of known content channels or backgrounds. By carefully composing the set of distinguishable features/patterns for the classifier to learn in the training stage, the resulting trained classifier when deployed is a compact and robust classification model that is extendable to learn sample images of additional content channels.

In one embodiment, the classifier is a decision tree. In another embodiment, the classifier is a neural network.

FIG. 1 illustrates an example computing architecture 100 for moving text region detection for broken text recovery, in one or more embodiments. The computing architecture 100 comprises at least one training server 110 including resources, such as one or more processor units 120 and one or more storage units 130. One or more applications 140 may execute/operate on the training server 110 utilizing the resources of the training server 110.

In one embodiment, the one or more applications 140 executing/operating on the training server 110 are configured to perform off-device (i.e., offline) training. In one embodiment, the off-device training comprises: (1) generating training data comprising a plurality of sets of distinguishable features/patterns of moving text regions of different content channels, and (2) training a classification model based on the training data. As described in detail later herein, the resulting trained classified model may be deployed for use to classify an image of a moving text region as originating from one of the different content channels. The resulting trained classified model may be deployed for use in detecting a location of a moving text region of a content channel, and restoring broken text in the area/region.

In one embodiment, the computing architecture 100 comprises at least one electronic device 200 including resources, such as one or more processor units 210 and one or more storage units 220. One or more applications 260 may execute/operate on the electronic device 200 utilizing the resources of the electronic device 200.

In one embodiment, the one or more applications 260 executing/operating on the electronic device 200 are configured to perform on-device (i.e., online) classification. In one embodiment, the on-device classification comprises: (1) detecting a location of a moving text region of a content channel using a trained classification model (e.g., from a training server 110), and (2) restoring broken text in the area/region.

In one embodiment, the one or more applications 260 may further include one or more software mobile applications loaded onto or downloaded to the electronic device 200, such as a camera application, a social media application, a video streaming application, etc.

Examples of an electronic device 200 include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, an electronic device 200 comprises one or more input/output (I/O) units 230 integrated in or coupled to the electronic device 200. In one embodiment, the one or more I/O units 230 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 230 to configure one or more parameters, provide user input, etc.

In one embodiment, an electronic device 200 comprises one or more sensor units 240 integrated in or coupled to the electronic device 200. In one embodiment, the one or more sensor units 240 include, but are not limited to, a RGB color sensor, an IR sensor, an illuminance sensor, a color temperature sensor, a camera, a microphone, a GPS, a motion sensor, etc.

In one embodiment, an electronic device 200 comprises a communications unit 250 configured to exchange data with at least one training server 110 over a communications network/connection 50 (e.g., a wireless connection such as a Wi-Fi connection or a cellular data connection, a wired connection, or a combination of the two). The communications unit 250 may comprise any suitable communications circuitry operative to connect to a communications network and to exchange communications operations and media between the electronic device 200 and other devices connected to the same communications network 50. The communications unit 250 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, a trained classification model (e.g., from a training server 110) is loaded on or downloaded to an electronic device 200, such that the trained classification model can perform on-device (i.e., on the electronic device 200) classification.

Figure 2:
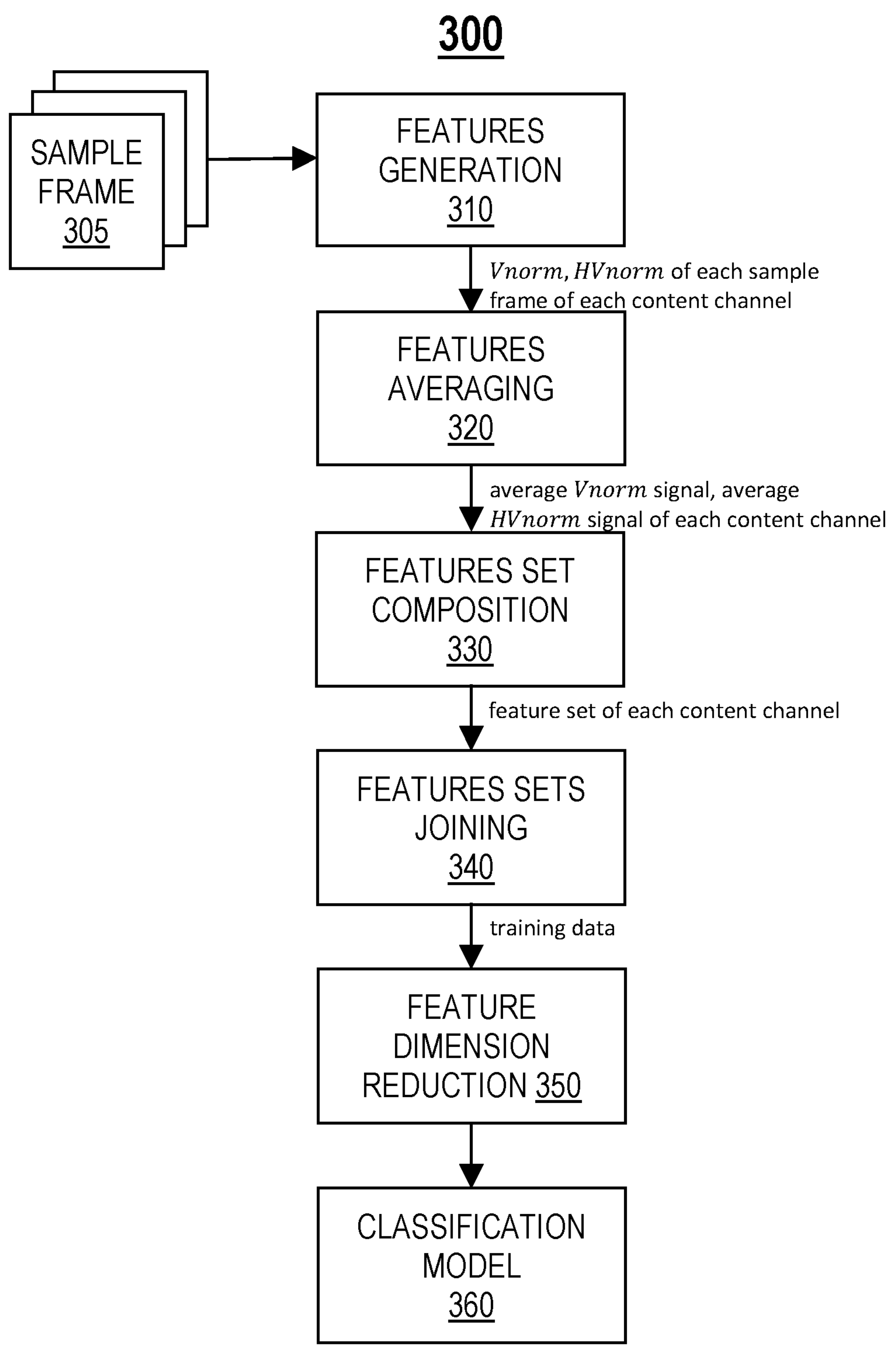
FIG. 2 illustrates an example training system for training a classification model to learn distinguishable features/patterns of moving text regions of different content channels, in one or more embodiments.

FIG. 2 illustrates an example training system 300 for training a classification model to learn distinguishable features/patterns of moving text regions of different content channels, in one or more embodiments. In one embodiment, one or more applications 140 (FIG. 1) executing/operating on a training server 110 (FIG. 1) include the training system 300.

In one embodiment, the training system 300 comprises a features generation unit 310 configured to receive, as input, a plurality of sample frames 305 of a plurality of content channels. In one embodiment, the plurality of sample frames 305 includes, for each of the plurality of content channels, multiple sample frames 305 (e.g., 500 sample frames) of the same content channel. In one embodiment, each sample frame 305 comprises an image/pixel patch (e.g., 100×160 image/pixel patch) segmented from a middle bottom of a subsampled grayscale image (e.g., of size 270×480 pixels) of a content channel, wherein the image/pixel patch excludes interference from unrelated areas/regions of the image (i.e., areas/regions that do not display a moving text region) and maintains a small search space.

In one embodiment, the features generation unit 310 is configured to utilize vertical edges and horizontal edges of multiple sample frames 305 of a content channel to identify and generate features of the content channel. Specifically, for each sample frame i of a content channel, the features generation unit 310 determines a corresponding vertical edge strength V[i] (along a vertical direction) and a corresponding horizontal edge strength H[i] (along a horizontal direction) of the sample frame i. In one embodiment, a vertical edge strength V[i] and a horizontal edge strength H[i] of a sample frame i are determined in accordance with equations (1)-(2) provided below:

$$V[i] = \sum_j |pix[i, j] - pix[i, j+1]|, \text{ and} \tag{1}$$

-continued $$H[i] = \sum_j |pix[i, j] - pix[i+1, j]|. \tag{2}$$

Next, for each sample frame i of a content channel, the features generation unit 310 normalizes a corresponding vertical edge strength V[i] and a corresponding horizontal edge strength H[i] of the sample frame i to obtain a corresponding normalized vertical edge strength Vnorm[i] and a corresponding normalized horizontal edge strength Hnorm[i] of the sample frame i. In one embodiment, a normalized vertical edge strength Vnorm[i] and a normalized horizontal edge strength Hnorm[i] of a sample frame i are obtained using 10 bit, in accordance with equations (3)-(4) provided below:

$$Vnorm[i] = 1023 \times V[i]/(Vmax+1), \text{ and} \tag{3}$$

$$Hnorm[i] = 1023 \times H[i]/(Hmax+1), \tag{4}$$

$$\text{wherein } Vmax = \max_{\forall k} V[k], \text{ and } Hmax = \max_{\forall k} H[k].$$

Next, for each sample frame i of a content channel, the features generation unit 310 determine a corresponding ratio of horizontal edges to vertical edges HV[i] of the sample frame i. In one embodiment, a ratio of horizontal edges to vertical edges HV[i] of a sample frame i is determined in accordance with equation (5) provided below:

$$HV[i] = 1023 \times \max(1, Hnorm[i]) / \left(\frac{Vnorm[i] + Vnorm[i+1]}{2} + THdiv\right), \tag{5}$$

wherein THdiv is a regularization constant.

Next, for each sample frame i of a content channel, the features generation unit 310 normalizes a corresponding ratio of horizontal edges to vertical edges HV[i] of the sample frame i to obtain a corresponding normalized ratio of horizontal edges to vertical edges HVnorm[i] of the sample frame i. In one embodiment, a normalized ratio of horizontal edges to vertical edges HVnorm[i] of a sample frame i is obtained using 10 bit, in accordance with equation (6) provided below:

$$HVnorm[i] = 1023 \times HV[i] / (HVmax+1), \tag{6}$$

$$\text{wherein } HVmax = \max_{\forall k} HV[k].$$

As described in detail later herein, for each content channel, a normalized vertical edge strength Vnorm[i] and a normalized ratio of horizontal edges to vertical edges HVnorm[i] of each sample frame i of the content channel are used to detect desired features/patterns of the content channel. In one embodiment, $i \in [1, 100]$ (i.e., each content channel has one hundred (100) Vnorm and one hundred (100) HVnorm, or two hundred (200) total).

In one embodiment, the training system 300 comprises a features averaging unit 320. For each content channel, the features averaging unit 320 is configured to: (1) receive, for each sample frame i of the content channel, a corresponding normalized vertical edge strength Vnorm[i] and a corresponding normalized ratio of horizontal edges to vertical edges HVnorm[i] of the sample frame i, and (2) average all Vnorm received and all HVnorm received for the content channel over all sample frames (e.g., over all 500 sample frames) of the content channel, resulting in an average Vnorm signal and an average HVnorm signal which together represent an average template of the content channel.

In one embodiment, the training system 300 comprises a features set composition unit 330. For each content channel, the features set composition unit 330 is configured to: (1) receive an average Vnorm signal and an average HVnorm signal of the content channel, (2) select one or more peak points from the average Vnorm signal and one or more peak points from the average HVnorm signal, wherein each peak point represents a peak strength and corresponding position, and (3) compose a corresponding set of distinguishable features/patterns ("features set") of the content channel based on the one or more peak points from the average Vnorm signal and the one or more peak points from the average HVnorm signal. The features set composition unit 330 utilizes a set/subset of peak strengths and corresponding positions of the average Vnorm signal and the average HVnorm signal as distinguishable features/patterns to identify the content channel, with one or more weights for suppressing error when the horizontal edge signals and the vertical edge signals are weak (e.g., below pre-specified thresholds).

In one embodiment, if the total number of peak points selected is five (5), the corresponding features set of the content channel has a maximum of five (5) elements, and the total number of distinguishable features/patterns included in the corresponding features set is $$\sum_{r=1}^{5} \frac{5!}{r!(5-r)}.$$

For example, the peak points selected may comprise three (3) peak points from the average HVnorm (e.g., $HV_0$, $HV_2$, $HV_4$) and two (2) peak points from the average Vnorm signal (e.g., $V_1$, $V_3$).

In one embodiment, the training system 300 comprises a features sets joining unit 340 configured to: (1) receive, for each content channel, a corresponding features set of the content channel, and (2) join all features sets received, resulting in training data. For example, if there are two hundred (200) content channels, the features sets joining unit 340 joins two hundred (200) features sets.

In one embodiment, the training system 300 comprises a feature dimension reduction unit 350 configured to: (1) receive training data (e.g., from the features sets joining unit 340), and (2) train, based on the training data, a classification model 360 to reduce feature dimension, resulting in a trained classification model 360. The trained classification model 360 may be deployed for use on an electronic device 200 (FIG. 1) for on-device classification.

In one embodiment, the feature dimension of the trained classification model 360 is about one hundred (100). Increasing of the feature dimension (e.g., up to 200) (e.g., directly using sets of HV and V as training data) may reduce the size of trained classification model 360 which in turn may not improve robustness of the trained classification model 360.

In one embodiment, the trained classification model 360 comprises a trained decision tree. In another embodiment, the trained classification model 360 comprises a trained neural network.

In one embodiment, the training system 300 utilizes one or more other combinations of HV, H, and V to identify a content channel.

Figure 3:
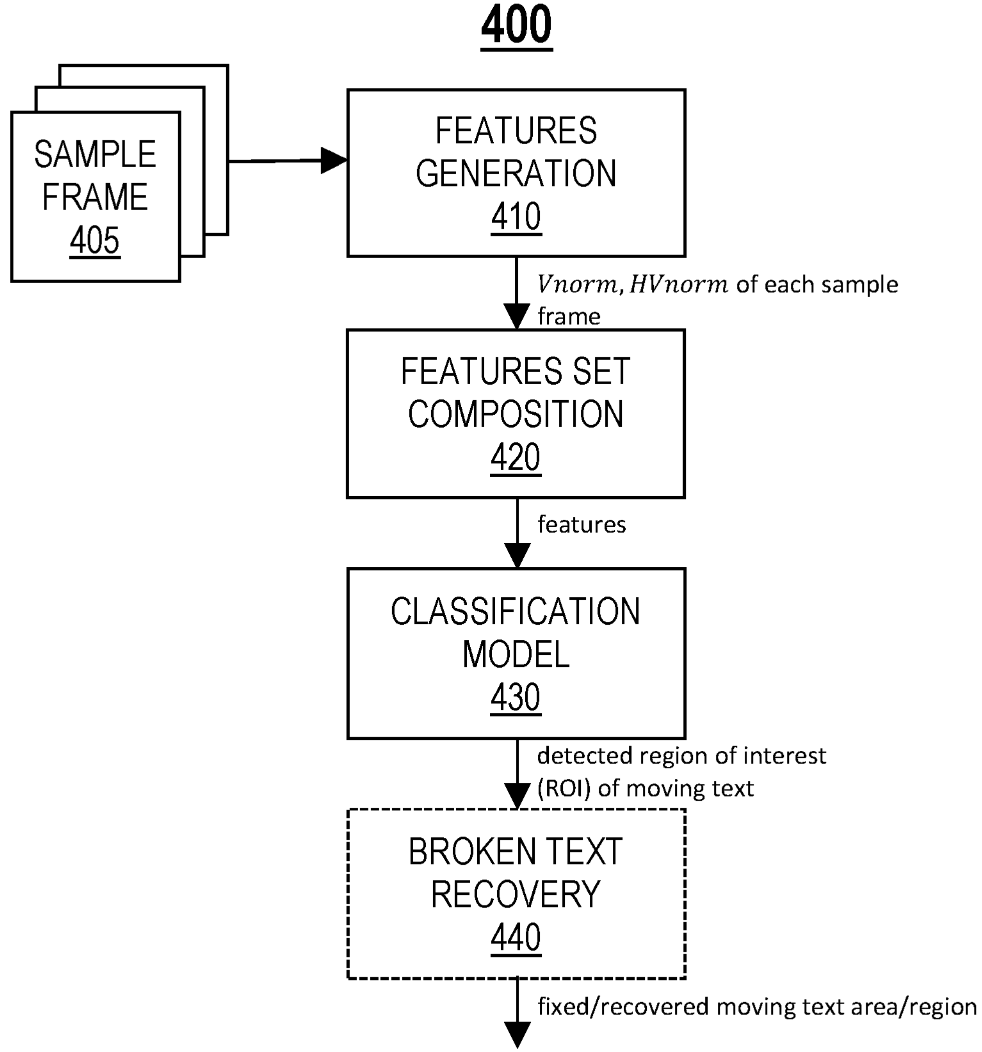
FIG. 3 illustrates an example on-device classification system for on-device detection of a moving text region for broken text recovery.

FIG. 3 illustrates an example on-device classification system 400 for on-device detection of a moving text region for broken text recovery, in one or more embodiments. In one embodiment, one or more applications 260 (FIG. 1) executing/operating on an electronic device 200 (FIG. 1) include the on-device classification system 400.

In one embodiment, the on-device classification system 400 comprises a feature dimension reduction unit 410 configured to: (1) receive, as input, multiple sample frames 405 of a content channel received at the electronic device 200 (e.g., the content channel is broadcasted or streamed to the electronic device 200), and (2) for each sample frame 405 received, generate a corresponding normalized vertical edge strength Vnorm and a normalized ratio of horizontal edges to vertical edges HVnorm of the sample frame 405 (e.g., in accordance with equations (1)-(6) provided above). In one embodiment, each sample frame 405 comprises an image/pixel patch (e.g., 100×160 image/pixel patch) segmented from a middle bottom of a subsampled grayscale image (e.g., of size 270×480 pixels) of the content channel, wherein the image/pixel patch excludes interference from unrelated areas/regions of the image (i.e., areas/regions that do not display a moving text region) and maintains a small search space.

In one embodiment, the on-device classification system 400 comprises a features set composition unit 420 configured to: (1) for each sample frame of a content channel, receive a corresponding normalized vertical edge strength Vnorm and a corresponding normalized ratio of horizontal edges to vertical edges HVnorm of the sample frame, and (2) join all Vnorm received and all HVnorm received for the content channel, resulting in a corresponding features set of sample frames of the content channel. In one embodiment, the feature dimension of the corresponding features set is about one hundred (100).

In one embodiment, the on-device classification system 400 comprises a classification model 430 loaded on or downloaded to the electronic device 200 (e.g., from a training server 110). The classification model 430 is trained to learn distinguishable features/patterns of different moving text areas/regions originating from different content channels. In one embodiment, the classification model 430 is configured to: (1) receive a features set of sample frames of a content channel (e.g., from the features set composition unit 420), (2) classify the features set with a classification identifying one of the different content channels that the features set originates from, and (3) detect a region of interest (ROI) of moving text in the sample frames.

In one embodiment, the on-device classification system 400 optionally comprises a broken text recovery unit 440 configured to: (1) receive a detected ROI of moving text in sample frames of a content channel (e.g., from the classification model 430), and (2) fix/recover broken text in the detected ROI, resulting in a fixed/recovered moving text region for display during presentation of the content channel. In another embodiment, the broken text recovery unit 440 is a separate application 260 (FIG. 1) executing/operating on the electronic device 200 (FIG. 1) that the on-device classification system 400 exchanges data with.

Figure 4:
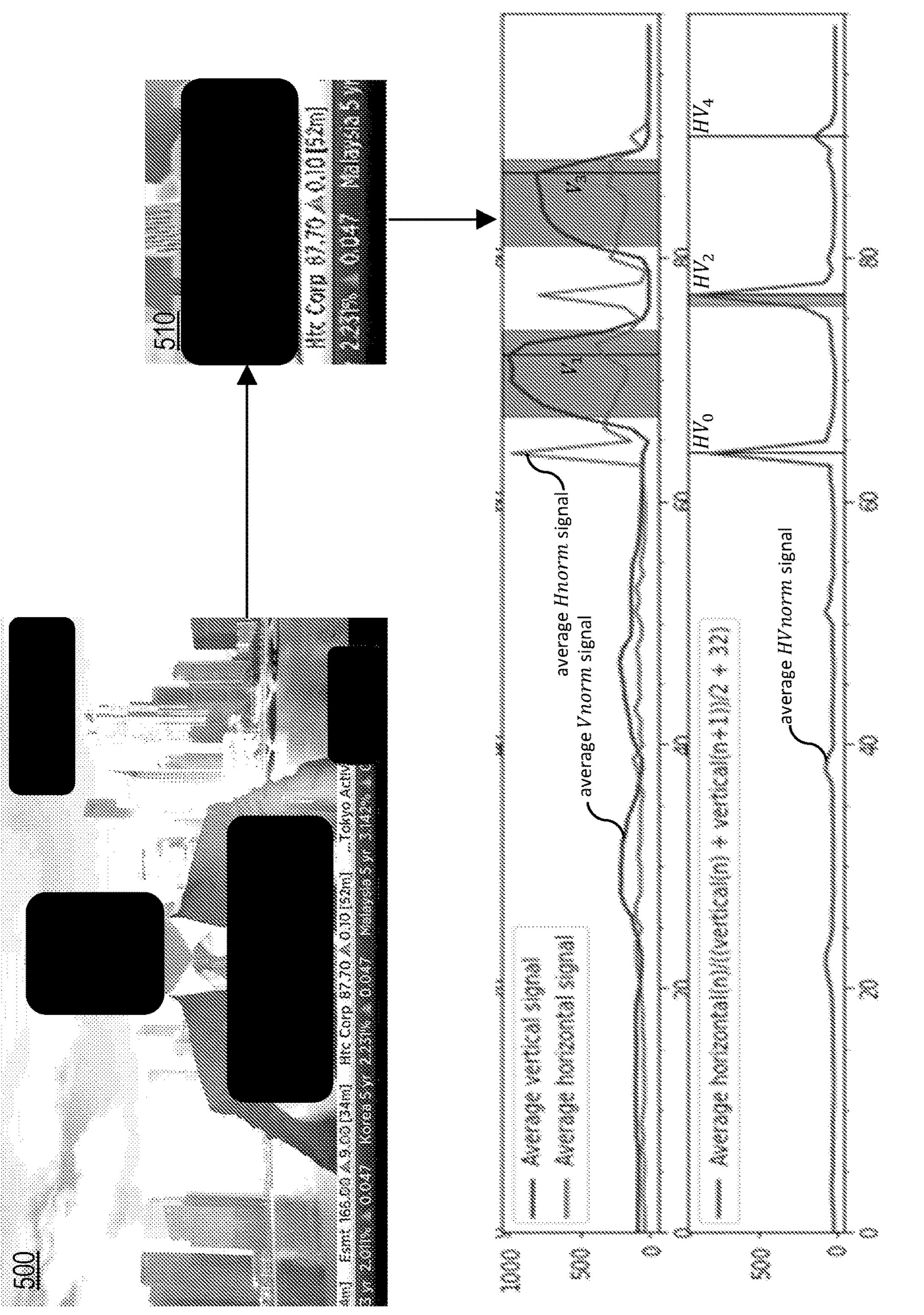
FIG. 4 illustrates an example workflow of the training system, in one or more embodiments.

FIG. 4 illustrates an example workflow of the training system 300, in one or more embodiments. In one embodiment, the training system 300 receives multiple sample frames 510 of a content channel, wherein each sample frame 510 comprises an image/pixel patch (e.g., 100×160 image/ pixel patch) segmented from a middle bottom of a subsampled grayscale image 500 (e.g., of size 270×480 pixels) of the content channel. Based on the sample frames 510, the training system 300 determines an average Vnorm signal and an average HVnorm signal of the content channel, selects one or more peak points from the average Vnorm signal and one or more peak points from the average HVnorm signal, and composes a corresponding features set of the content channel based on the one or more peak points from the average Vnorm signal and the one or more peak points from the average HVnorm signal. For example, the peak points selected may comprise three (3) peak points from the average HVnorm (e.g., $HV_0$, $HV_2$, $HV_4$) and two (2) peak points from the average Vnorm signal (e.g., $V_1$, $V_3$).

Figure 5:
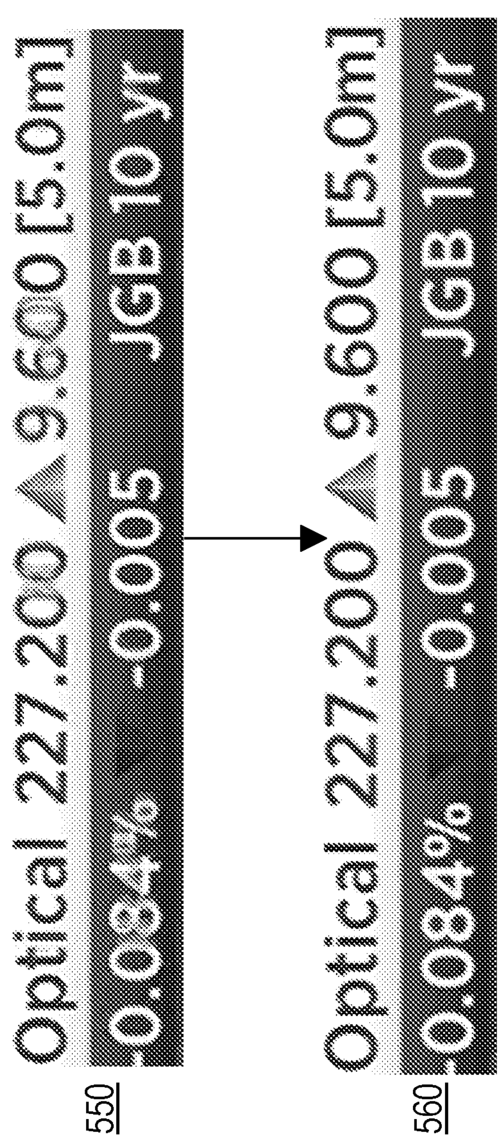
FIG. 5 illustrates a visual comparison between a moving text region with broken text and a moving text region with fixed/recovered text, in one or more embodiments.

FIG. 5 illustrates a visual comparison between a moving text region 550 with broken text and a moving text region 560 with fixed/recovered text, in one or more embodiments. In one embodiment, the on-device classification system 400 receives multiple sample frames of a content channel, classifies (using a trained classification model) a features set of the sample frames with a classification identifying one of different content channels that the features set originates from, detects the moving text region 550 with broken text based on the classification, and fixes/recovers the broken text, resulting in the moving text region 560 with fixed/recovered text.

Figure 6:
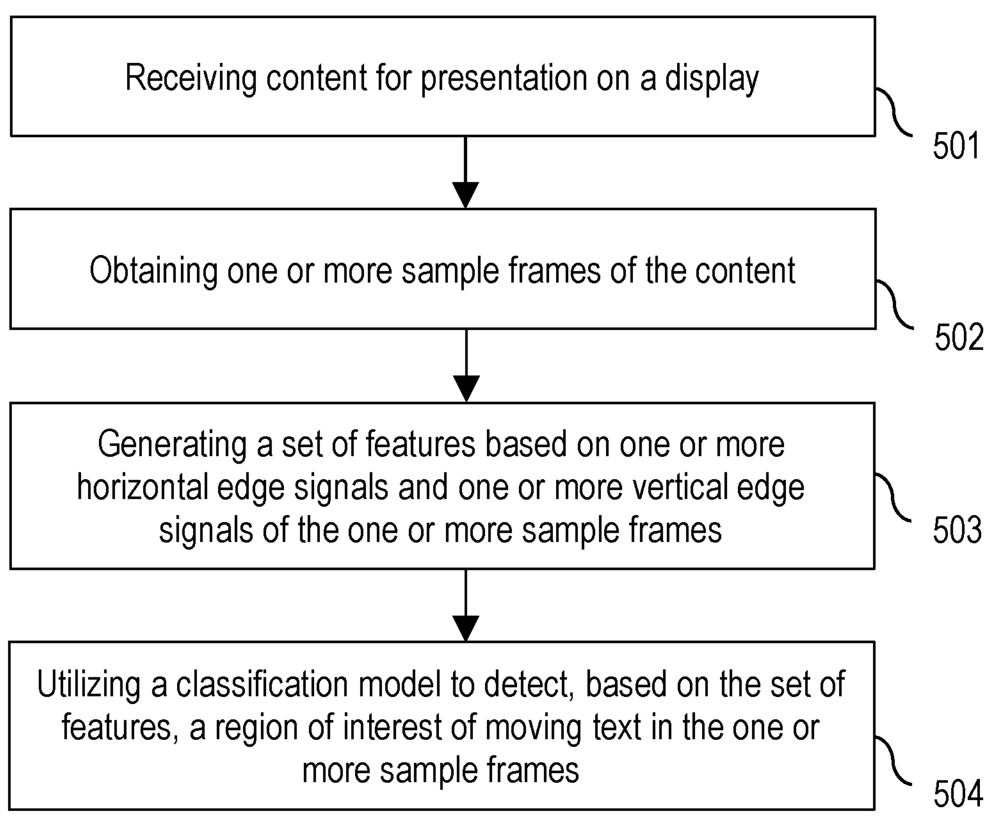
FIG. 6 is a flowchart of an example process for implementing moving text region detection for broken text recovery, in one or more embodiments.

FIG. 6 is a flowchart of an example process 500 for implementing moving text region detection for broken text recovery, in one or more embodiments. Process block 501 includes receiving content for presentation on a display. Process block 502 includes obtaining one or more sample frames of the content. Process block 503 includes generating a set of features based on one or more horizontal edge signals and one or more vertical edge signals of the one or more sample frames. Process block 504 includes utilizing a classification model to detect, based on the set of features, a region of interest of moving text in the one or more sample frames.

In one embodiment, process blocks 501-504 may be performed by one or more components of the on-device classification system 400.

Figure 7:
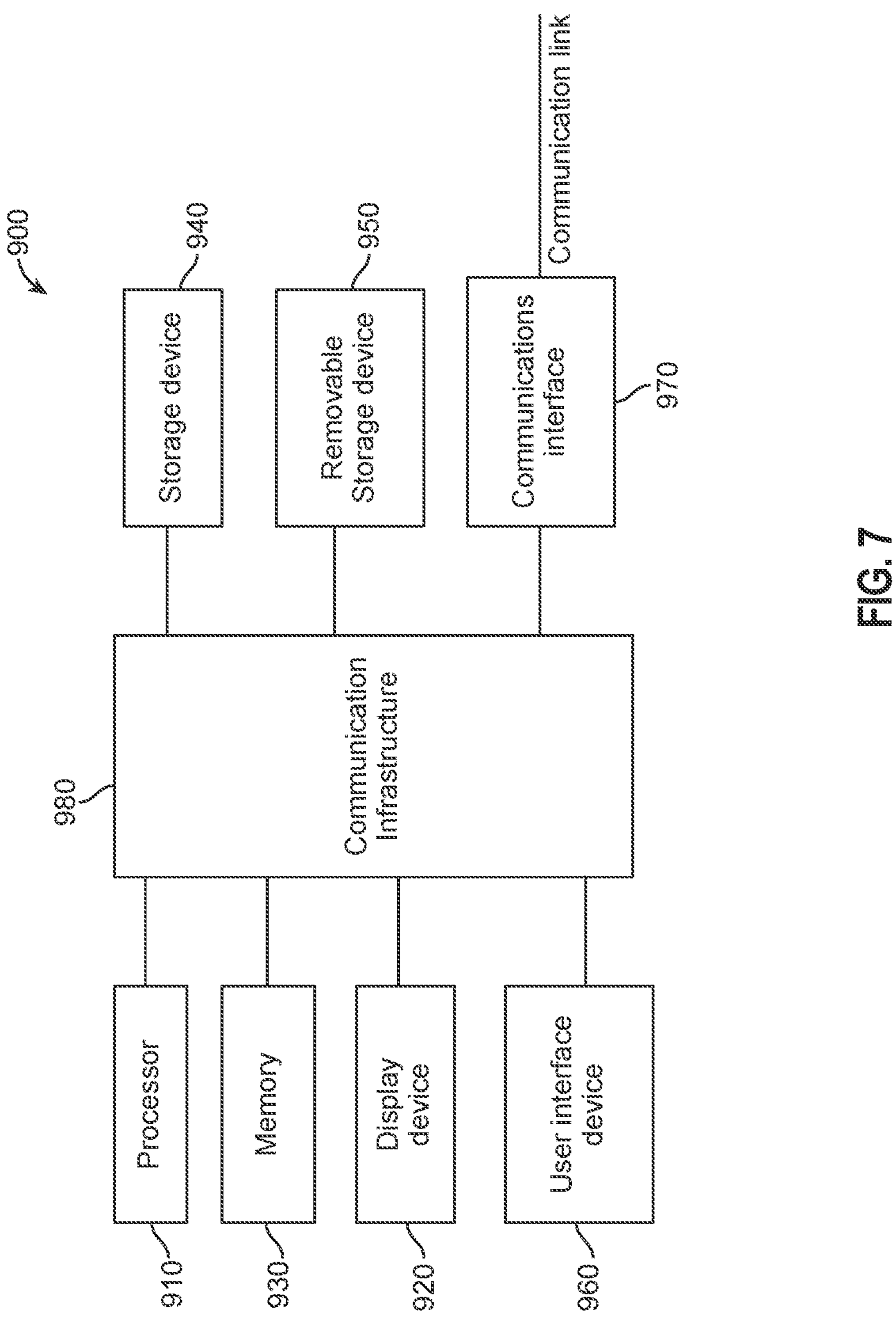
FIG. 7 is a high-level block diagram showing an information processing system comprising a computer system useful for implementing the disclosed embodiments.

FIG. 7 is a high-level block diagram showing an information processing system comprising a computer system 900 useful for implementing the disclosed embodiments. The system 300 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 500 (FIG. 6) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:

receiving content for presentation on a display;

obtaining one or more sample frames of the content;

generating a set of features based on one or more horizontal edge signals and one or more vertical edge signals of the one or more sample frames;

utilizing a classification model to classify the set of features with a classification identifying a content channel which the content originates from, wherein for each of a plurality of different content channels, the classification model is trained to learn different sets of features indicative of where and how moving text is displayed by the plurality of different content channels; and detecting, based on the classification, a region of interest of moving text in the one or more sample frames.

2. The method of claim 1, wherein the set of features is based on peak strengths and corresponding positions from averages of normalized values of the following: the one or more vertical edge signals, and ratios of the one or more horizontal edge signals to the one or more vertical edge signals.

3. The method of claim 1, wherein the classification model is trained to learn different sets of features indicative of where and how moving text is displayed by a plurality of different content channels.

4. The method of claim 1, further comprising:

correcting one or more visual artifacts in the region of interest, wherein the one or more visual artifacts include broken text.

5. The method of claim 1, wherein the classification model is trained offline.

6. The method of claim 1, wherein the classification model comprises a decision tree.

7. The method of claim 1, wherein the classification model comprises a neural network.

8. The method of claim 1, wherein each sample frame comprises an image patch segmented from a middle bottom of a subsampled grayscale image of the content.

9. A system comprising:

at least one processor; and a non-transitory processor-readable memory device storing instructions that when executed by the at least one processor causes the at least one processor to perform operations including:

receiving content for presentation on a display;

obtaining one or more sample frames of the content;

generating a set of features based on one or more horizontal edge signals and one or more vertical edge signals of the one or more sample frames;

utilizing a classification model to classify the set of features with a classification identifying a content channel which the content originates from, wherein for each of a plurality of different content channels, the classification model is trained to learn different sets of features indicative of where and how moving text is displayed by the plurality of different content channels; and detecting, based on the classification, a region of interest of moving text in the one or more sample frames.

10. The system of claim 9, wherein the set of features is based on peak strengths and corresponding positions from averages of normalized values of the following: the one or more vertical edge signals, and ratios of the one or more horizontal edge signals to the one or more vertical edge signals.

11. The system of claim 9, wherein the classification model is trained to learn different sets of features indicative of where and how moving text is displayed by a plurality of different content channels.

12. The system of claim 9, wherein the operations further include:

correcting one or more visual artifacts in the region of interest, wherein the one or more visual artifacts include broken text.

13. The system of claim 9, wherein the classification model is trained offline.

14. The system of claim 9, wherein the classification model comprises a decision tree.

15. The system of claim 9, wherein the classification model comprises a neural network.

16. The system of claim 9, wherein each sample frame comprises an image patch segmented from a middle bottom of a subsampled grayscale image of the content.

17. A non-transitory computer readable medium that includes a program that when executed by a processor performs a method comprising:

receiving content for presentation on a display;

obtaining one or more sample frames of the content;

generating a set of features based on one or more horizontal edge signals and one or more vertical edge signals of the one or more sample frames;

utilizing a classification model to classify the set of features with a classification identifying a content channel which the content originates from, wherein for each of a plurality of different content channels, the classification model is trained to learn different sets of features indicative of where and how moving text is displayed by the plurality of different content channels; and detecting, based on the classification, a region of interest of moving text in the one or more sample frames.

18. The non-transitory computer readable medium of claim 17, wherein the set of features is based on peak strengths and corresponding positions from averages of normalized values of the following: the one or more vertical edge signals, and ratios of the one or more horizontal edge signals to the one or more vertical edge signals.

19. The non-transitory computer readable medium of claim 17, wherein the method further comprises:

correcting one or more visual artifacts in the region of interest, wherein the one or more visual artifacts include broken text.

20. The non-transitory computer readable medium of claim 17, wherein the classification model is trained offline.

* * * * *